US008311225B2

(12) United States Patent  
Singh et al.

(10) Patent No.: US 8,311,225 B2  
(45) Date of Patent: Nov. 13, 2012

(54) SCALABLE KEY ARCHIVAL

(75) Inventors: Jitendra Kumar Singh, Los Gatos, CA (US); Lyndon Siao, San Jose, CA (US); Narada Jared Hess, Menlo Park, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 586 days.

(21) Appl. No.: 12/542,662

(22) Filed: Aug. 17, 2009

(65) Prior Publication Data

US 2011/0038482 A1 Feb. 17, 2011

(51) Int. Cl.  
*H04L 29/06* (2006.01)

(52) U.S. Cl. .................... 380/279; 380/277; 380/278

(58) Field of Classification Search .......... 380/277–279, 380/286  
See application file for complete search history.

(56) References Cited

U.S. PATENT DOCUMENTS

| 2006/0291664 A1* | 12/2006 | Suarez et al. | 380/286 |
| 2008/0307054 A1* | 12/2008 | Kamarthy et al. | 709/206 |
| 2010/0082991 A1* | 4/2010 | Baldwin et al. | 713/176 |
| 2010/0125730 A1* | 5/2010 | Dodgson et al. | 713/153 |

OTHER PUBLICATIONS

Dufrasne et al, "IBM System Storage DS8700 Disk Encryption Implementation and Usage Guidelines," IBM Redpaper, Dec. 2009, pp. 1-168.
IBM Corporation, "Information Infrastructure for the World's Most Demanding Clients: IBM System Storage DS8000 Technical Update," Mar. 3, 2009, pp. 1-24.
Buecker et al, "Using IBM Tivoli Key Lifecycle Manager: Business Benefits and Architecture Overview," IBM Redguides for Business Leaders, Oct. 27, 2009, pp. 1-28.
SNIA Storage Security Industry Forum, "SSIF Solutions Guide for Data-At-Rest," 2009, pp. 1-36.
Brocade Communications Systems, Inc., "Brocade Encryption Switch: High-Performance Encryption for Data-at-Rest," 2009, pp. 1-4.
Kipp, Scott, "Key Management for Fabric-Based Encryption," Brocade Communications Systems, Inc., Aug. 25, 2008, pp. 1-20.
"Brocade Encryption Switch," RSA Secured Implementation Guide, Jun. 16, 2009, pp. 1-29.
"QuickSpecs: Overview: HP StorageWorks Secure Key Manager," HP-Invent, DA—12814, Worldwide—Version 7, Apr. 24, 2009, pp. 1-13.
"HP Key Management Overview," IEEE Key Management Summit, Sep. 23-24, 2008, pp. 1-25.

* cited by examiner

*Primary Examiner* — Jung Kim  
*Assistant Examiner* — Tri Tran  
(74) *Attorney, Agent, or Firm* — Nixon Peabody LLP; John P. Schaub

(57) ABSTRACT

A solution for scalable key archival includes, at a network device, determining whether a key management device that is not part of a current key management device configuration has been newly added to a network. The method also includes, if the key management device has been newly added to the network, determining whether the network device has a first application program interface (API) or device driver for communicating with the key management device. The method also includes, if the network device does not have the first API, obtaining the API. The method also includes creating a binding between a virtual device driver of the network device and the key management device via the first API, the network device having a second API for communications between the virtual device driver and a security processor of the network device. The security processor communicates with the key management device using the second API.

30 Claims, 6 Drawing Sheets

SCALABLE KEY ARCHIVAL

FIELD OF THE INVENTION

The present invention relates to the field of computer science. More particularly, the present invention relates to scalable key archive architecture.

BACKGROUND OF THE INVENTION

As security threats become more sophisticated and data becomes more critical to corporate data centers, companies must stay one step ahead of new and existing security threats to ensure their data is secured to the fullest possible extent.

The term "Data at rest" refers to all data in computer storage while excluding data that is traversing a network or temporarily residing in computer memory to be read or updated. Data at rest can be archival or reference files that are changed rarely or never; data at rest can also be data that is subject to regular but not constant change. Examples include vital corporate files stored on the hard drive of an employee's notebook computer, files on an external backup medium, files on the servers of a storage area network (SAN), or files on the servers of an offsite backup service provider.

One technology commonly used to address security threats to data at rest is encryption, which secures data from unauthorized access using cryptographic keys. Storage devices such as tape drives, enterprise-class applications, network solutions and disk subsystems (such as those in virtual tape libraries) all utilize key-based encryption schemes in various forms.

A key management system maintains cryptographic keys used in data at rest encryption. Multiple key management systems are presently available, including IBM's TKLM (Tivoli Key Lifecycle Manager), Netapp's LKM (Lifetime Key Management), RSA's RKM (RSA Key Manager), and Hewlet Packard's SKM (Secure Key Manager). Each key management system has its own set of interfaces for communicating with the particular key management system. Because each key management system has its own set of interfaces, an enterprise desiring to use multiple key management systems must modify its own system to accommodate each set of interfaces. And even after such modifications have been made to accommodate an additional key management system, the enterprise system must be configured to recognize the presence of the additional key management system on the network.

Additionally, some key management systems provide varying degrees of redundancy and high availability (HA) so that operations on keys such as archival and retrieval are not affected by the loss of a key management system, for example due to a system crash. Some key management systems provide no redundancy, some fail to guarantee a time window for key replication, and some fail to provide feedback as to when a key has been replicated to multiple systems.

Accordingly, a need exists in the art for an improved solution for data encryption key archival.

SUMMARY OF THE INVENTION

A solution for scalable key archival includes, at a network device, determining whether a key management device that is not part of a current key management device configuration has been newly added to a network. The method also includes, if the key management device has been newly added to the network, determining whether the network device has a first application program interface (API) or device driver for communicating with the key management device. The method also includes, if the network device does not have the first API, obtaining the API. The method also includes creating a binding between a virtual device driver of the network device and the key management device via the first API, the network device having a second API for communications between the virtual device driver and a security processor of the network device. The security processor communicates with the key management device using the second API.

According to one aspect, the method also includes determining whether a discovered key management system supports redundancy and high availability and specifics of these capabilities, and if not present, to provide such capability by connecting to multiple key management systems (if present on the network) and archiving keys to two or more of these key management systems. In instances where the key management systems provide partial high availability, the method provides the missing capabilities in all cases to ensure key records in the multiple key management systems are consistent and synchronized before they are used.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
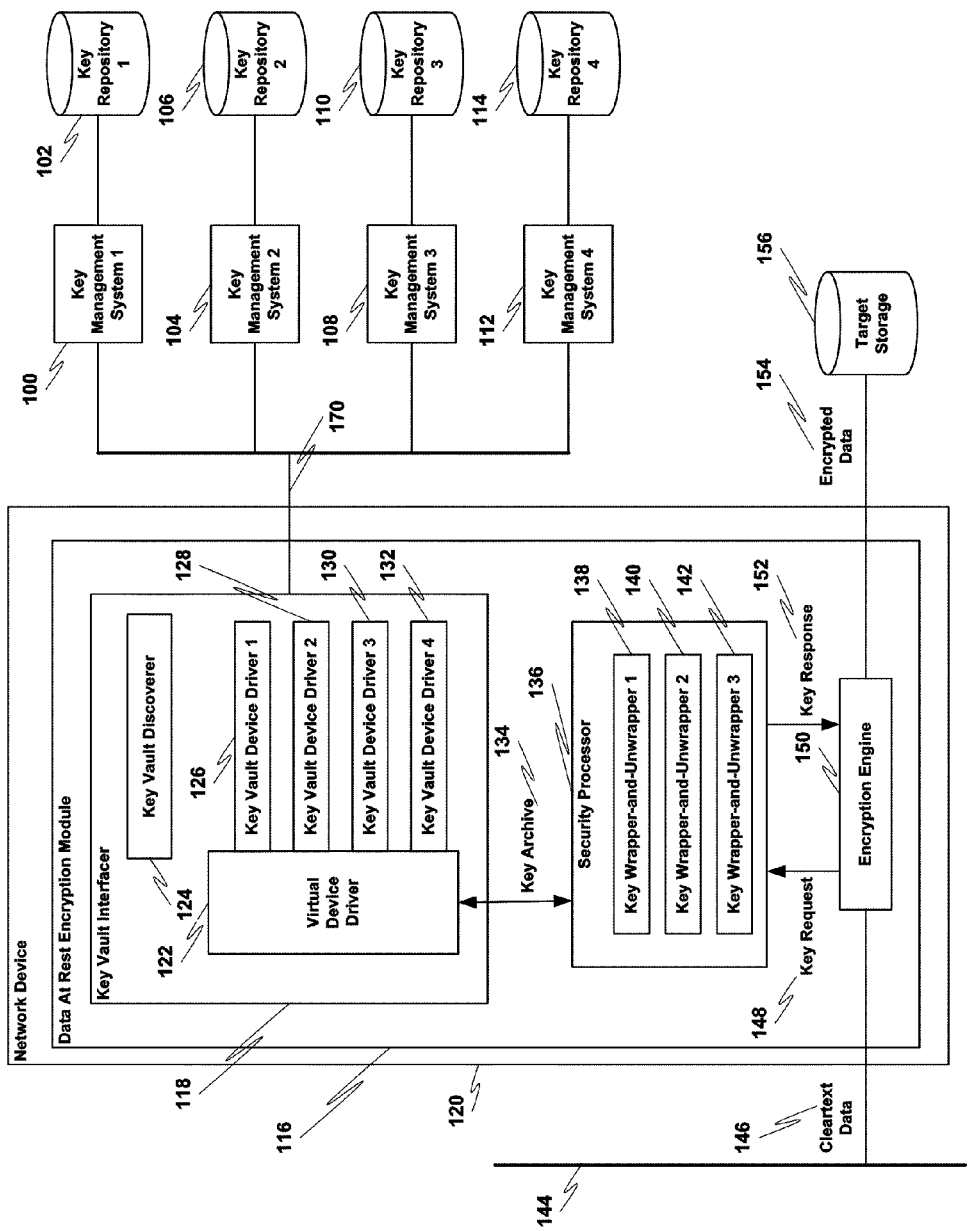
FIG. 1 is a block diagram that illustrates a system for scalable key archival in accordance with one embodiment of the present invention.

Embodiments of the present invention are described herein in the context of scalable key archival. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general-purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes local area networks (LANs), wide area networks (WANs), metro area networks, residential networks, corporate networks, inter-networks, the Internet, the World Wide Web, cable television systems, telephone systems, wireless telecommunications systems, fiber optic networks, token ring networks, Ethernet networks, ATM networks, frame relay networks, satellite communications systems, and the like. Such networks are well known in the art and consequently are not further described here.

In the context of the present invention, the term "identifier" describes an ordered series of one or more numbers, characters, symbols, or the like. More generally, an "identifier" describes any entity that can be represented by one or more bits.

In the context of the present invention, the term "distributed" describes a digital information system dispersed over multiple computers and not centralized at a single location.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

In the context of the present invention, the term "network interface" describes the means by which users access a network for the purposes of communicating across it or retrieving information from it.

In the context of the present invention, the term "system" describes any computer information and/or control device, devices or network of devices, of hardware and/or software, comprising processor means, data storage means, program means, and/or user interface means, which is adapted to communicate with the embodiments of the present invention, via one or more data networks or connections, and is adapted for use in conjunction with the embodiments of the present invention.

In the context of the present invention, the term "primitive" describes an executable procedure or function. Inputs to the primitive and outputs provided by the primitive may be specified in an API. When a primitive is executed, it may perform one or more actions, return one or more results, or both.

It should be noted that the key archival system is illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

Example embodiments of the present invention provide a scalable solution to data at rest encryption with multiple heterogeneous key management systems. A first API specifies an interface between a data at rest encryption module of a network device and a virtual device driver of the network device. A second API specifies an interface between the virtual device driver and a key management system. A key management system vendor provides device drivers in accordance with or that implements the second API. The virtual device driver implements primitives of the first API by invoking appropriate primitives of the second API. A discovery mechanism detects new key management systems and adds them to a current configuration without requiring modification of the data at rest encryption module.

FIG. 1 is a block diagram that illustrates a system for scalable key archival in accordance with one embodiment of the present invention. As shown in FIG. 1, network device 120 includes a data at rest encryption module 116 configured to encrypt cleartext data 146 and decrypt encrypted data 154 using one or more data encryption keys. The one or more data encryption keys are managed by one or more key management systems (100, 104, 108, 112). Although four key management systems (100, 104, 108, 112) are shown in FIG. 1, network device 120 may interface with any number of key management systems. Each of the one or more key management systems (100, 104, 108, 102) is associated with a key repository (102, 106, 110, 114) for storing data encryption keys. Encrypted data 154 is stored in target storage 156.

Still referring to FIG. 1, data at rest encryption module 116 includes key vault interfacer 118, security processor 136, and encryption engine 150. Encryption engine 150 is configured to request a data encryption key (148) from security processor 136 and receive a data encryption key (152) in response to the request. Encryption engine 150 is further configured to use the received key to encrypt cleartext data 146 or to decrypt encrypted data 154.

Security processor 136 is configured to receive a data encryption key request 148 and send a data encryption key (152) in response to the request 148. Security processor 136 includes one or more key wrapper-and-unwrappers (138, 140, 142, 152). The key wrapper-and-unwrappers (138, 140, 142, 152) implement wrapping and unwrapping algorithms for one or more keyvaults. The selection as to which algorithm to use is based at least in part on the keyvault characteristics which are provided dynamically in the discovery process, or keyvault characteristics which are configured by an administrator. The key wrapper-and-unwrappers (138, 140, 142, 152) are configured to encrypt a data encryption key for transport over a network 170 to a key management system (100, 104, 108, 112), and to decrypt an encrypted data encryption key transported over the network 170 from a key management system (100, 104, 108, 112). Security processor 136 is configured to interface with one or more key management systems (100, 104, 108, 112) via an API with key vault interfacer 118.

Key vault interfacer 118 includes a virtual device driver 122, a key vault discoverer 124, and one or more key vault device drivers (126, 128, 130, 132). Key vault interfacer 118 includes a key vault device driver and associated API for each key management system currently supported by the data at rest encryption module 116. In the example illustrated by FIG. 1, key vault device drivers 126, 128, 130, and 132 represent the key vault device drivers and associated APIs that support interfacing with key management systems 100, 104, 108, and 112, respectively. Discoverer 124 is configured to discover a keyvault or accept a broadcast packet from a key management system. After a keyvault has been discovered, the actual device driver which includes all the APIs is dynamically loaded. According to another embodiment of the present invention, the discoverer is configured to, if the keyvault device driver is not present, download the keyvault device driver from the keyvault or obtain it using a URL which is a link to it and included as part of keyvault characterstics information.

Still referring to FIG. 1, virtual device driver 122 is configured to translate communications from security processor 136 based on the API for a particular key management system (100, 104, 108, 112). For example, security processor 136 stores a data encryption key in key repository 102 of key management system 100 by using the "PutKey" primitive provided by the API between security processor 136 and key vault interfacer 118.

According to one embodiment of the present invention, if key management system 100 does not support high availability or provides only partial high availability support (determined by the key management system capabilities provided during a discovery process), the virtual device driver stores the data encryption key redundantly, or checks for the key replication across key management systems (in case of partial HA support) in a second available key management system on the network which may be of the same type as 100 or of a different type such as 104 using their respective PutKey primitives, or the like. See Table 1 below for more examples of primitives for this API. Virtual device driver 122 translates the "PutKey" command based on the functionality provided by key vault device driver 126. See Table 2 below for more examples of primitives for this API.

Key vault discoverer 124 is configured to determine whether a key management device that is not part of a current key management device configuration has been newly added to a network. Key vault discoverer 124 is further configured to, if the key management device has been newly added to the network, determine whether the network device has an API for communicating with the key management device. Key vault discoverer 124 is further configured to, if the network device has the API, create a binding between a virtual device driver of the network device and the key management device via the API.

According to one embodiment of the present invention, key vault discoverer 124 is configured to determine whether a key management device that is not part of a current key management device configuration has been newly added to a network by periodically checking the network for the presence of a key management device that is not part of a current key management device configuration. The current key management device configuration may be stored in a memory of network device 116 and may include, for each key management device currently configured with network device 120, an identification of the key management device and characteristics of the key management device. Example characteristics of the key management device include the type and number of keys that the key management device can manage, the type of key management policies that the key management device implements, whether the key management device provides for high availability (redundancy), and how a client must authenticate itself e.g. via x.509 certificates, and the like.

According to another embodiment of the present invention, key vault discoverer 124 is configured to determine whether a key management device that is not part of a current key management device configuration has been newly added to a network by examining a broadcast message sent by the newly added key management device. The broadcast message may include an identification of the key management device and characteristics of the key management device.

According to another embodiment of the present invention, key vault discoverer 124 is configured to, if a key management device driver does not exist for a discovered key management device, download the key management device driver from the key management device, or from a URL reference the key management device provides in the characterstics description block it returns via a broadcast message or in response to an inquiry.

Figure 2:
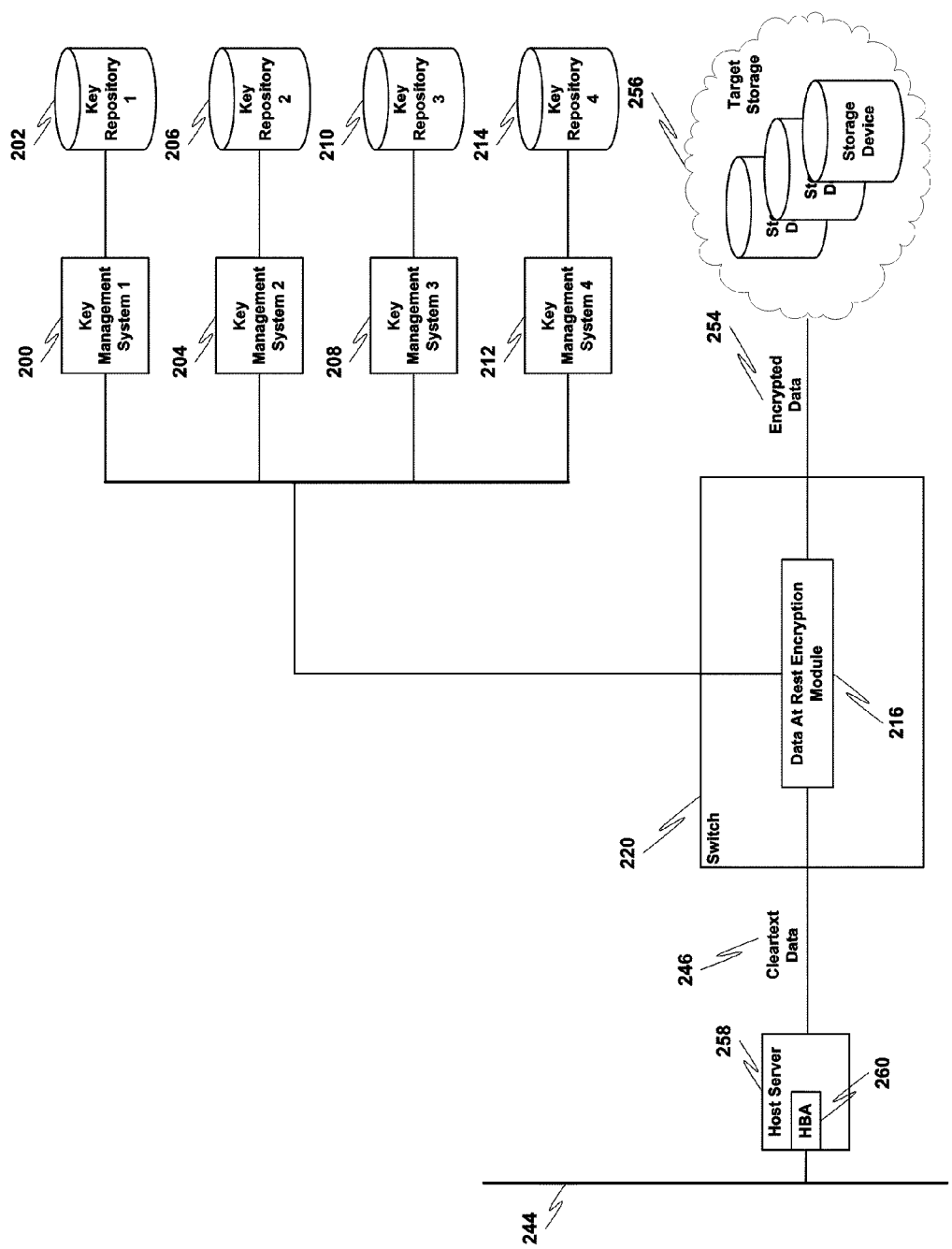
FIG. 2 is a block diagram that illustrates a system for scalable key archival having a data at rest encryption module in a network switch in accordance with one embodiment of the present invention.

FIG. 2 is a block diagram that illustrates a system for scalable key archival having a data at rest encryption module in a network switch in accordance with one embodiment of the present invention. As shown in FIG. 2, a network switch 220 includes data at rest encryption module 216, which corresponds with data at rest encryption module 116 of FIG. 1. Data at rest encryption module 216 is configured to encrypt cleartext data 246 and decrypt encrypted data 254 using one or more data encryption keys. The one or more data encryption keys are managed by one or more key management systems (200, 204, 208, 212). Although four key management systems (200, 204, 208, 212) are shown in FIG. 2, network device 220 may interface with any number of key management systems. Encrypted data 254 is stored in target storage 256.

Figure 3:
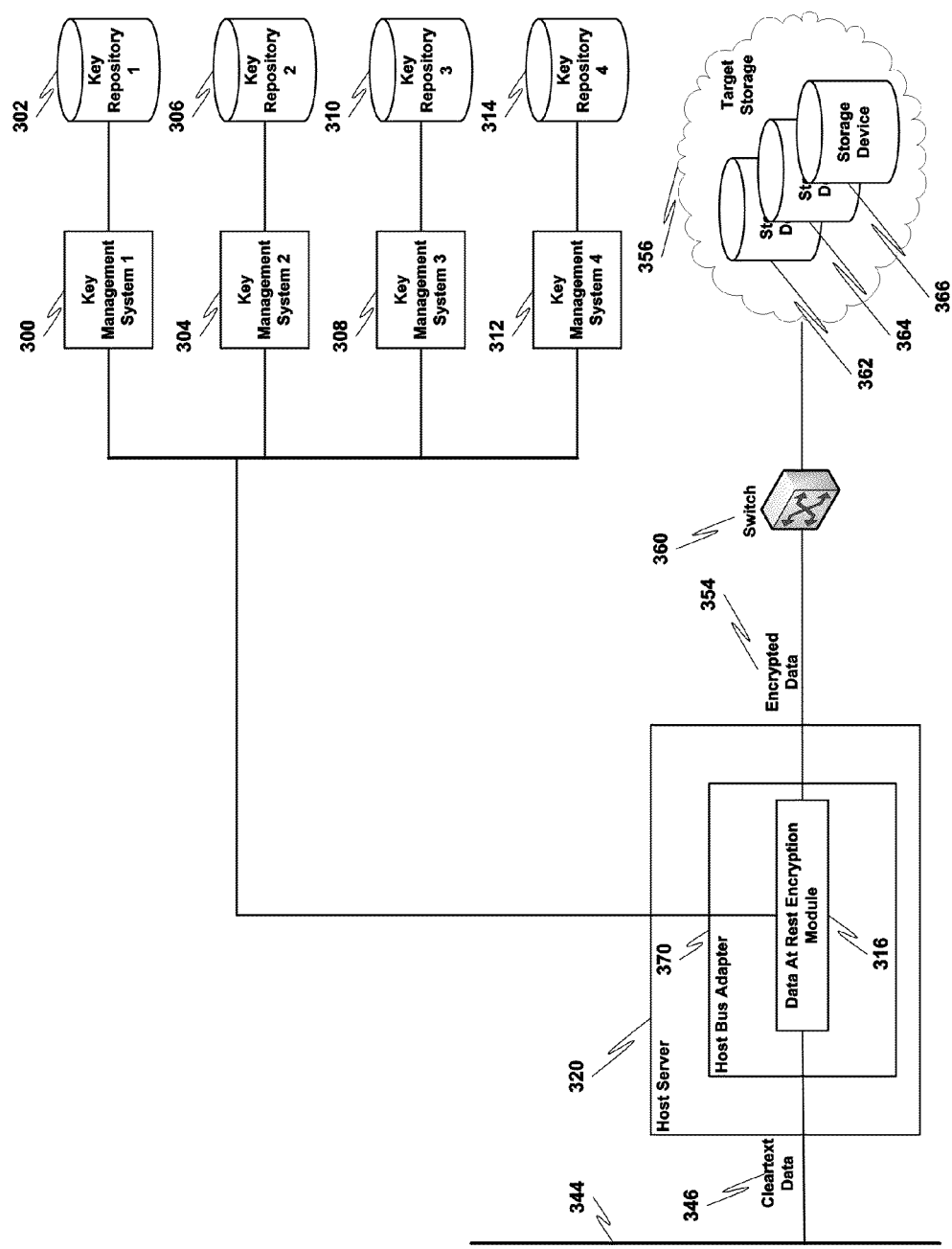
FIG. 3 is a block diagram that illustrates a system for scalable key archival having a data at rest encryption module in a host bus adapter of a host server in accordance with one embodiment of the present invention.

FIG. 3 is a block diagram that illustrates a system for scalable key archival having a data at rest encryption module in a host bus adapter of a host server in accordance with one embodiment of the present invention. As shown in FIG. 3, host server 320 includes host bus adapter 370, which includes data at rest encryption module 316. Network 344 is extraneous to the operation of the data at rest encryption since the host server 320 is the entity that generates the clear text data. This clear text data is then passed on to the HBA 370 which sends out encrypted data as shown.

Data at rest encryption module 316 corresponds with data at rest encryption module 116 of FIG. 1. Data at rest encryption module 316 is configured to encrypt cleartext data 346 and decrypt encrypted data 354 using one or more data encryption keys. The one or more data encryption keys are managed by one or more key management systems (300, 304, 308, 312). Although four key management systems (300, 304, 308, 312) are shown in FIG. 3, network device 320 may interface with any number of key management systems. Encrypted data 354 is stored in target storage 356, which comprises one or more storage devices (362, 364, 366).

Figure 4:
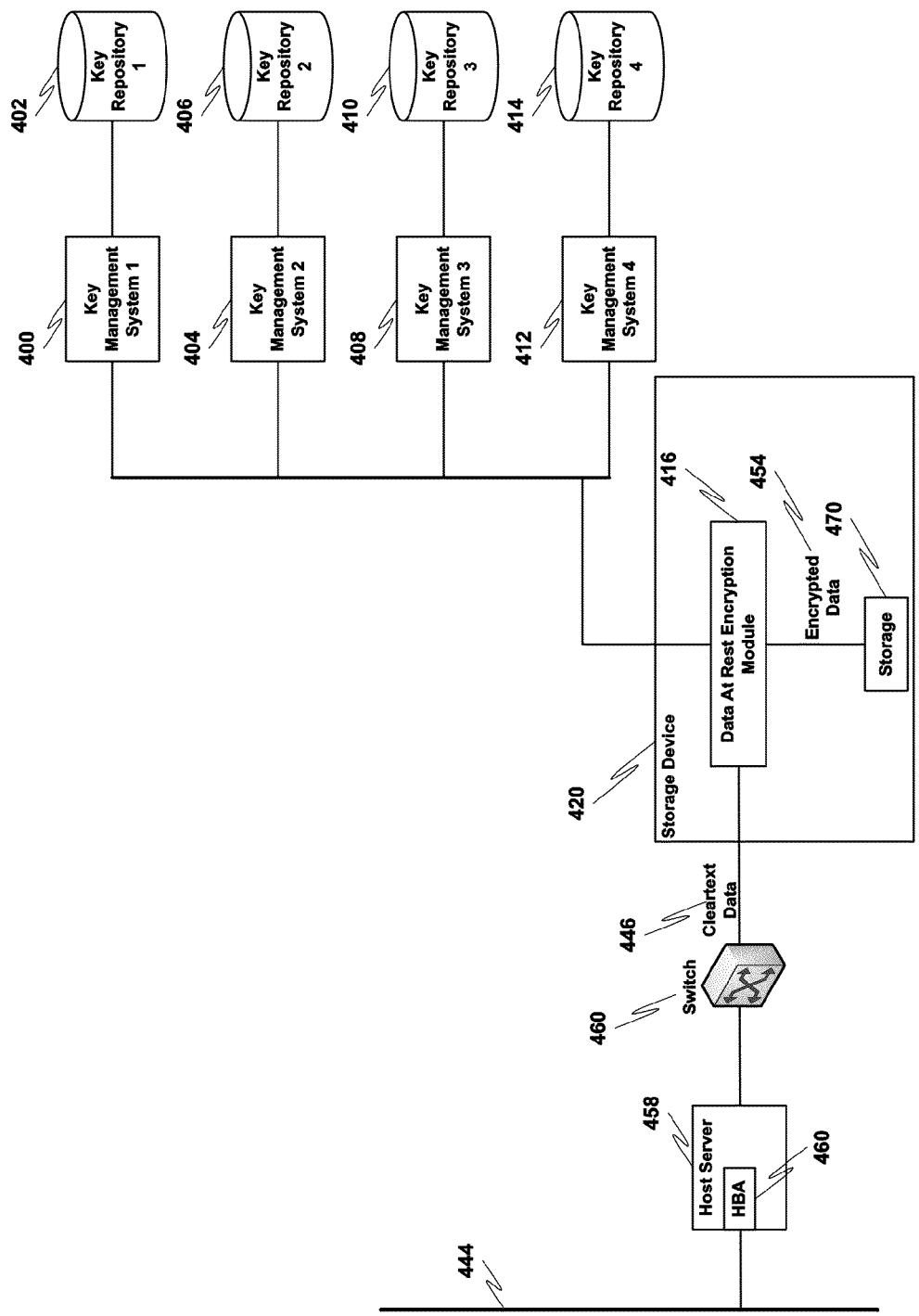
FIG. 4 is a block diagram that illustrates a system for scalable key archival having a data at rest encryption module in a storage device in accordance with one embodiment of the present invention.

FIG. 4 is a block diagram that illustrates a system for scalable key archival having a data at rest encryption module in a storage device in accordance with one embodiment of the present invention. As shown in FIG. 4, storage device 420 includes data at rest encryption module 416, which corresponds with data at rest encryption module 116 of FIG. 1. Data at rest encryption module 416 is configured to encrypt cleartext data 446 and decrypt encrypted data 454 using one or more data encryption keys. The one or more encryption keys are managed by one or more key management systems (400, 404, 408, 412). Although four key management systems (400, 404, 408, 412) are shown in FIG. 4, network device 420 may interface with any number of key management systems. Encrypted data 454 is stored in the storage medium 470 of the storage device 420.

Figure 5:
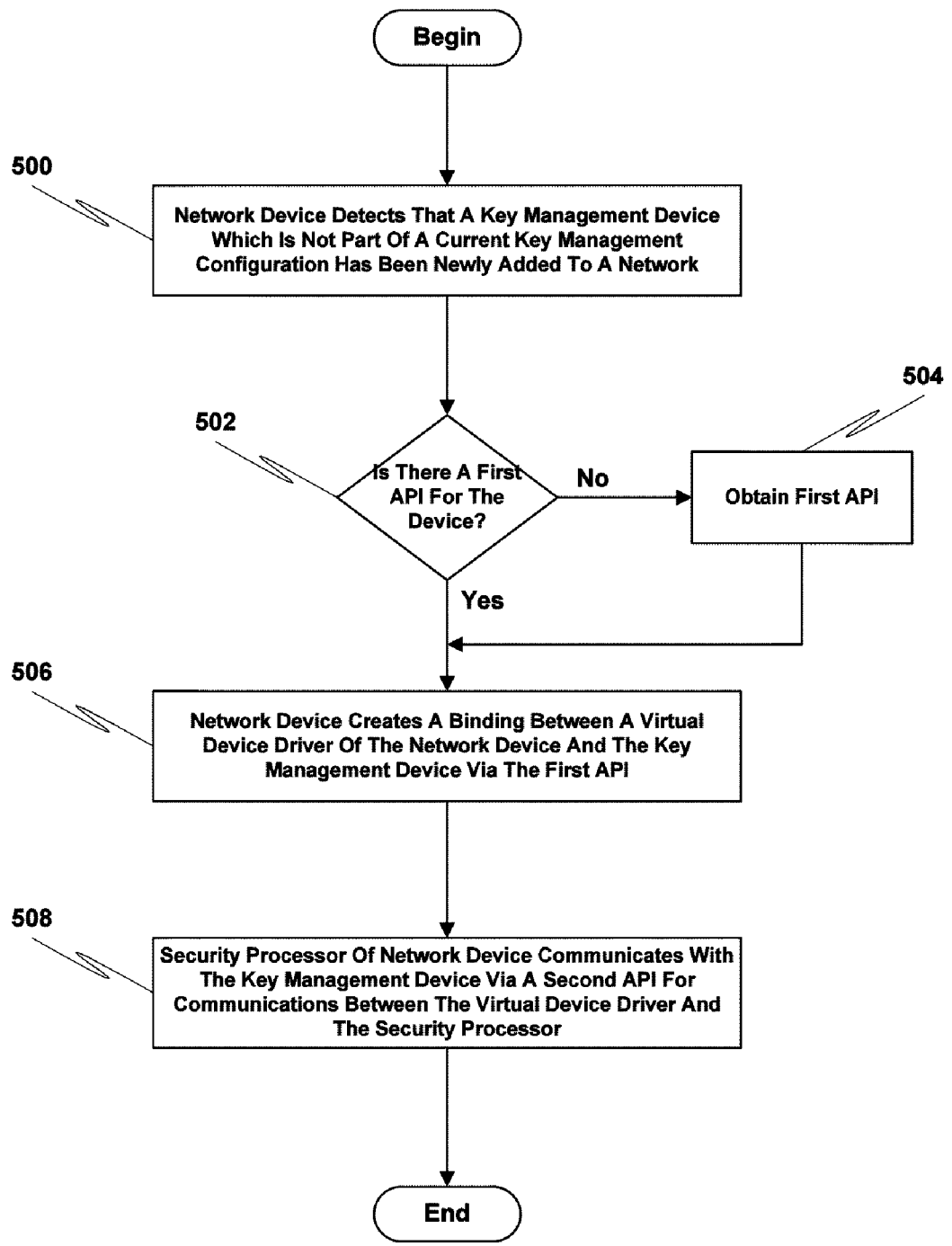
FIG. 5 is a flow diagram that illustrates a method for scalable key archival in accordance with one embodiment of the present invention.

FIG. 5 is a flow diagram that illustrates a method for scalable key archival in accordance with one embodiment of the present invention. The processes illustrated in FIG. 5 may be implemented in hardware, software, firmware, or a combination thereof. For example, the process illustrated in FIG. 5 may be implemented by data at rest encryption module 116 of FIG. 1, data at rest encryption module 216 of FIG. 2, data at rest encryption module 316 of FIG. 3, or data at rest encryption module 416 of FIG. 4.

Still referring to FIG. 5, at 500, a network device detects that a key management device which is not part of a current key management configuration has been newly added to a network. At 502, a determination is made regarding whether there is an API for the key management device. At 504, if the network device does not have the first API, the first network device obtains the first API. The first API may be obtained by from the key management device directly, or indirectly by information such as a URL provided by the key management device. At 506, the network device creates a binding between a virtual device driver of the network device and the key management device via the API. At 508, a security processor of the network device communicates with the key management device using a second API. The second API is for communications between the virtual device driver and the security processor.

The following description provides more details for the first and second APIs in accordance with one embodiment of the present invention. The "first API" is also referred to as the "Security Processor API." And the "second API" is also referred to as the "Key Vault Interfacer" API.

Security Processor API

According to one embodiment of the present invention, an API defining an interface between a security processor and a key vault interfacer comprises one or more of the primitives in Table 1 below. According to another embodiment of the present invention, an API defining an interface between a security processor and a key vault interfacer comprises all of the primitives in Table 1. The primitive names indicated in Table 1 are for ease of reference; primitives having the indicated function may be named differently than what is shown in Table 1.

TABLE 1

| Security Processor API | |
|---|---|
| Name | Function |
| Connect | Connects to and configures the specified key vault with a specified address and a Key Vault certificate. The address can be in the form of, for example, hostname, IPv4, or IPv6 formats |
| Disconnect | Disconnects specified key vaults |
| Shutdown | Closes connections on all key vault sessions |
| GetKeyVaultInfo | Returns a quantity of key vault sessions opened, and status information<br>A key vault status is considered "up" if a valid response is received from the key vault GetKey operation, regardless of whether the key exists |
| ReserveKeyID | Reserves a new key id from a key vault given an input media id |
| PutKey | Stores a key onto specified key vault sessions. If more than one key management system is configured to support high availability this interface may store keys to multiple key vault sessions or check for replication of keys across multiple key management systems that provide partial HA support (e.g. those that replicate but don't report or provide time window guarantees for replication). |

TABLE 1-continued

Security Processor API

| Name | Function |
|---|---|
| GetKey | Retrieves a key record corresponding to a specified key id from the first available key management system. |
| GetKeys | Retrieves a list of n most recently created actual keys associated with a media id. The list may include deleted keys |
| DeleteKey | Deletes a key associated with a given key id |
| DeleteKeys | Deletes a set of keys associated with a key id |
| EstablishSharedSecret | Establishes a shared secret between a key vault and a data at rest encryption module. It may be accomplished using a Diffie-Hillman key exchange protocol |
| DiscardSharedSecret | Discards a shared secret used for encrypting data encryption keys in communications between data at rest encryption module and a key management system |
| GetKeyVaultChar | Returns one or more key management device characteristics |
| SyncKeys | In configurations enabled for high availability, this interface checks for keys on multiple key management systems and ensures consistency by adding or deleting missing or extra keys. |

Key Vault Interfacer API

According to one embodiment of the present invention, an API defining an interface between a security processor and a key vault interfacer comprises one or more of the primitives in Table 2 below. According to another embodiment of the present invention, an API defining an interface between a security processor and a key vault interfacer comprises all of the primitives in Table 2. A key management device driver is expected to provide the primitives in Table 2. The primitive names indicated in Table 2 are for ease of reference; primitives having the indicated function may be named differently than what is shown in Table 2.

Figure 6:
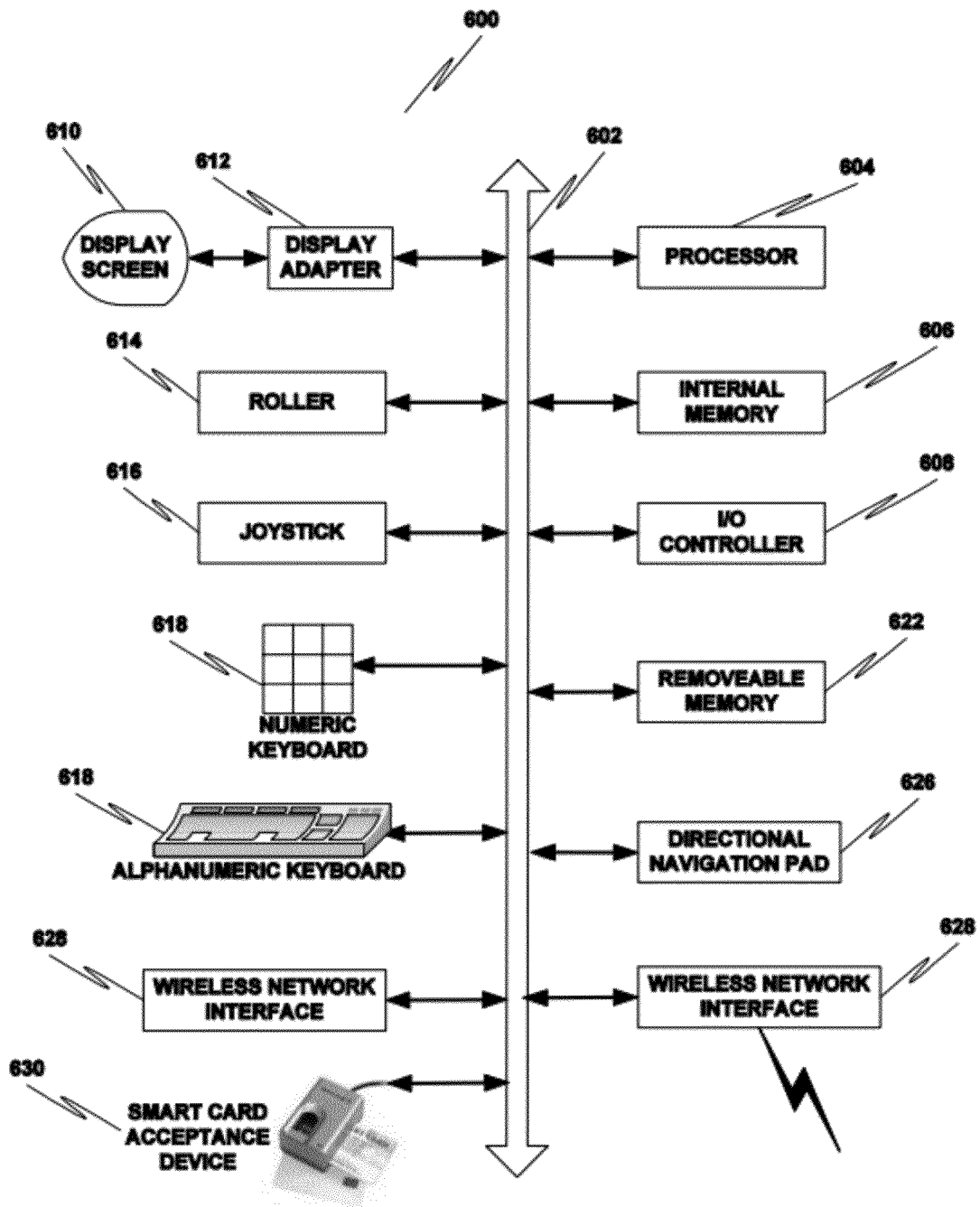
FIG. 6 is a block diagram of a computer system suitable for implementing aspects of the present invention.

FIG. 6 depicts a block diagram of a computer system 600 suitable for implementing aspects of the present invention. As shown in FIG. 6, system 600 includes a bus 602 which interconnects major subsystems such as a processor 604, an internal memory 606 (such as a RAM), an input/output (I/O) controller 608, a removable memory (such as a memory card) 622, an external device such as a display screen 610 via display adapter 612, a roller-type input device 614, a joystick 616, a numeric keyboard 618, an alphanumeric keyboard 618, directional navigation pad 626, smart card acceptance device 630, and a wireless interface 620. Many other devices can be connected. Wireless network interface 620, wired network interface 628, or both, may be used to interface to a local or

TABLE 2

Key Vault Interfacer API

| Name | Function |
|---|---|
| Initialization | Initializes the adapter |
| Connect | Connects to a specified key vault with a specified address. The address can be in the form of, for example, hostname, IPv4, or IPv6 formats |
| IsAlive | Checks for a key vault status by issuing a GetKey operation, or the like. If the GetKey fails because a key vault is no longer operational, a message may be generated and error code returned. Other operations could be issued to achieve the same result (determine keyvault status based on whether there is a response to a valid operation). |
| Disconnect | Disconnects key vaults associated with a specified handle and stops connectivity timer associated with the adapter |
| Shutdown | Closes connections on all key vault sessions and closes all resources used for the session |
| ReserveKeyID | Reserves a new key id from a key vault given an input media ID. The reservation of the key id may comprise a hash operation on a media ID, for example taking the first 16 bytes. The has operation may be performed on a different number of bytes instead. A record is created for a new key ID, for an existing key ID the record is read the key count field is incremented, the key count field is added to the hash and returned to the caller as the key ID |
| PutKey | Stores a key onto the specified key vault session |
| GetKey | Retrieves the key record corresponding to the provided key id |
| GetKeys | Retrieves a list of n most recently created actual keys |
| DeleteKeys | Deletes a key associated with a given key id |
| EstablishSharedSecret | Establishes a shared secret between a key vault and a data at rest encryption module. It may be accomplished using a Diffie-Hillman key exchange protocol |
| DiscardSharedSecret | Discards a shared secret used for encrypting data encryption keys in communications between data at rest encryption module and a key management system | wide area network (such as the Internet) using any network interface system known to those skilled in the art.

Many other devices or subsystems (not shown) may be connected in a similar manner. Also, it is not necessary for all of the devices shown in FIG. 6 to be present to practice the present invention. Furthermore, the devices and subsystems may be interconnected in different ways from that shown in FIG. 6. Code to implement the present invention may be operably disposed in internal memory 606 or stored on storage media such as removable memory 622, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory).

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method comprising:
   at a network device configured with, for each key management system that is part of a current key management device configuration, a device driver and associated application programming interface (API) for communicating with the respective key management system, determining whether a key management device that is not part of the current key management device configuration has been newly added to a network;
   if the key management device has been newly added to the network, determining whether the network device has a first API for communicating with the key management device;
   if the network device does not have the first API, obtaining the first API; and
   creating a binding between a virtual device driver of the network device and the key management device via the first API, the network device having a second API for communications between the virtual device driver and a security processor of the network device,
   wherein the security processor communicates with each key management device that is part of the current key management device configuration using the second API.

2. The method of claim 1 wherein the security processor communicates with the key management device using the second API to:
   send one or more data encryption keys to one or more key management devices for storage on the one or more key management devices; and
   obtain one or more data encryption keys from a first available key management device.

3. The method of claim 1 wherein the network device comprises a network switch.

4. The method of claim 1 wherein the network device comprises host bus adapter of a host server.

5. The method of claim 1 wherein the network device comprises storage device.

6. The method of claim 1 wherein the second API comprises:
   a first primitive for establishing a connection with a key management device;
   a second primitive for disconnecting a connection with a key management device;
   a third primitive for storing a key on a key management device; and
   a fourth primitive for retrieving a key from a key management device.

7. The method of claim 6 wherein the second API further comprises:
   a fifth primitive for deleting a key on a key management device; and
   a sixth primitive for deleting a plurality of keys on a key management device.

8. The method of claim 7 wherein the second API further comprises:
   a seventh primitive for obtaining information about all open key vault sessions;
   an eighth primitive for obtaining a new key ID; and
   a ninth primitive for obtaining a list of most recently created keys.

9. The method of claim 8 wherein the second API further comprises:
   a tenth primitive for disconnecting connections with all key management devices; and
   an eleventh primitive for disconnecting connections with all key management devices.

10. The method of claim 9 wherein the second API further comprises:
    a twelfth primitive for establishing a shared secret for communications with a key management device; and
    a thirteenth primitive for discarding a shared secret for communications with a key management device.

11. The method of claim 1 wherein the first API further comprises:
    a first primitive for initializing the first API;
    a second primitive for establishing a connection with a key management device;
    a third primitive for determining a current status of a key management device;
    a fourth primitive for disconnecting a connection with a key management device;
    a fifth primitive for disconnecting connections with all key management devices;
    a sixth primitive for reserving a new key ID;
    a seventh primitive for storing a key on a key management device;
    an eighth primitive for obtaining a key from a key management device;
    a ninth primitive for obtaining a list of most recently created keys;
    a tenth primitive for establishing a shared secret for communications with a key management device; and
    a eleventh primitive for discarding a shared secret for communications with a key management device;
    a twelfth primitive for obtaining one or more key management device characteristics.

12. The method of claim 1, further comprising determining whether a key management device that is not part of the current key management device configuration has been newly added to a network by periodically checking the network for the presence of a key management device that is not part of the current key management device configuration.

13. The method of claim 1, further comprising determining whether a key management device that is not part of the current key management device configuration has been newly added to a network by examining a broadcast message sent by the newly added key management device.

14. A network device comprising:
    for each key management system that is part of a current key management device configuration, a device driver and associated application programming interface (API) for communicating with the respective key management system a memory; and one or more processors configured to:
- determine whether a key management device that is not part of the current key management device configuration has been newly added to a network;
- if the key management device has been newly added to the network, determining whether the network device has a first API for communicating with the key management device;
- if the network device does not have the first API, obtain the first API; and
- create a binding between a virtual device driver of the network device and the key management device via the first API, the network device having a second API for communications between the virtual device driver and a security processor of the network device,
- wherein the security processor communicates with each key management device that is part of the current key management device configuration using the second API.

15. The network device of claim 14 wherein the security processor is configured to communicate with the key management device using the second API to:
- send one or more data encryption keys to one or more key management devices for storage on the one or more key management devices; and
- obtain one or more data encryption keys from a first available key management device.

16. The network device of claim 14 wherein the network device comprises a network switch.

17. The network device of claim 14 wherein the network device comprises host bus adapter of a host server.

18. The network device of claim 14 wherein the network device comprises storage device.

19. The network device of claim 14 wherein the second API comprises:
- a first primitive for establishing a connection with a key management device;
- a second primitive for disconnecting a connection with a key management device;
- a third primitive for storing a key on a key management device; and
- a fourth primitive for retrieving a key from a key management device.

20. The network device of claim 19 wherein the second API further comprises:
- a fifth primitive for deleting a key on a key management device; and
- a sixth primitive for deleting a plurality of keys on a key management device.

21. The network device of claim 20 wherein the second API further comprises:
- a seventh primitive for obtaining information about all open key vault sessions;
- an eighth primitive for obtaining a new key ID; and
- a ninth primitive for obtaining a list of most recently created keys.

22. The network device of claim 21 wherein the second API further comprises:
- a tenth primitive for disconnecting connections with all key management devices; and
- an eleventh primitive for disconnecting connections with all key management devices.

23. The network device of claim 22 wherein the second API further comprises:
- a twelfth primitive for establishing a shared secret for communications with a key management device; and
- a thirteenth primitive for discarding a shared secret for communications with a key management device.

24. The network device of claim 14 wherein the first API further comprises:
- a first primitive for initializing the first API;
- a second primitive for establishing a connection with a key management device;
- a third primitive for determining a current status of a key management device;
- a fourth primitive for disconnecting a connection with a key management device;
- a fifth primitive for disconnecting connections with all key management devices;
- a sixth primitive for reserving a new key ID;
- a seventh primitive for storing a key on a key management device;
- an eighth primitive for obtaining a key from a key management device;
- a ninth primitive for obtaining a list of most recently created keys;
- a tenth primitive for establishing a shared secret for communications with a key management device; and
- a eleventh primitive for discarding a shared secret for communications with a key management device
- a twelfth primitive for obtaining one or more key management device characteristics.

25. The network device of claim 14, further comprising determining whether a key management device that is not part of the current key management device configuration has been newly added to a network by periodically checking the network for the presence of a key management device that is not part of the current key management device configuration.

26. The network device of claim 14, further comprising determining whether a key management device that is not part of the current key management device configuration has been newly added to a network by examining a broadcast message sent by the newly added key management device.

27. A nontransitory program storage device readable by a machine, embodying a program of instructions executable by the machine to perform a method, the method comprising:
- at a network device configured with, for each key management system that is part of a current key management device configuration, a device driver and associated application programming interface (API) for communicating with the respective key management system, determining whether a key management device that is not part of the current key management device configuration has been newly added to a network;
- if the key management device has been newly added to the network, determining whether the network device has a first API for communicating with the key management device;
- if the network device does not have the first API, obtaining the first API; and
- creating a binding between a virtual device driver of the network device and the key management device via the first API, the network device having a second API for communications between the virtual device driver and a security processor of the network device,
- wherein the security processor communicates with each key management device that is part of the current key management device configuration using the second API.

28. A network device comprising:

means for determining whether a key management device that is not part of a current key management device configuration has been newly added to a network;

means for, if the key management device has been newly added to the network, determining whether the network device has a first application program interface (API) for communicating with the key management device;

means for, if the network device does not have the first API, obtaining the first API; and means for creating a binding between a virtual device driver of the network device and the key management device via the first API, the network device having a second API for communications between the virtual device driver and a security processor of the network device, wherein the security processor communicates with each key management device that is part of the current key management device configuration using the second API.

29. The method of claim 1, further comprising:

if the key management device has been newly added to the network, determining high availability capabilities of the newly added key management device and enabling one or more functions to support redundancy in the data at rest encryption module.

30. The network device of claim 14 wherein the one or more processors are further configured to, if the key management device has been newly added to the network, determine high availability capabilities of the newly added key management device and enabling one or more functions to support redundancy in the data at rest encryption module.

* * * * *